Jan. 2, 1945.  E. H. LEHMAN  2,366,201
FRICTION SHOCK ABSORBING MECHANISM
Filed Nov. 8, 1943
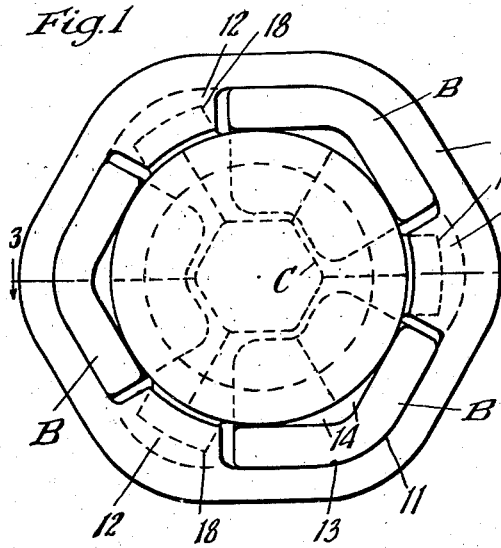
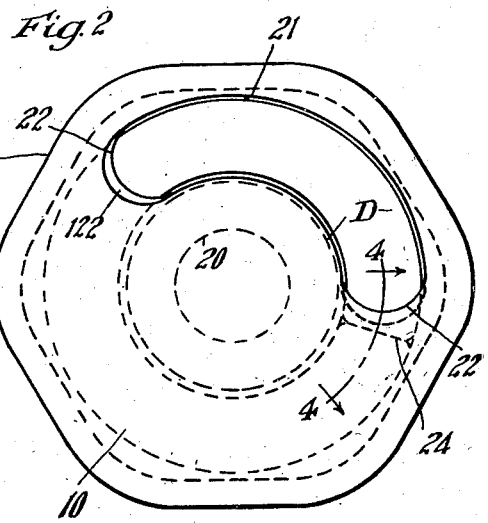
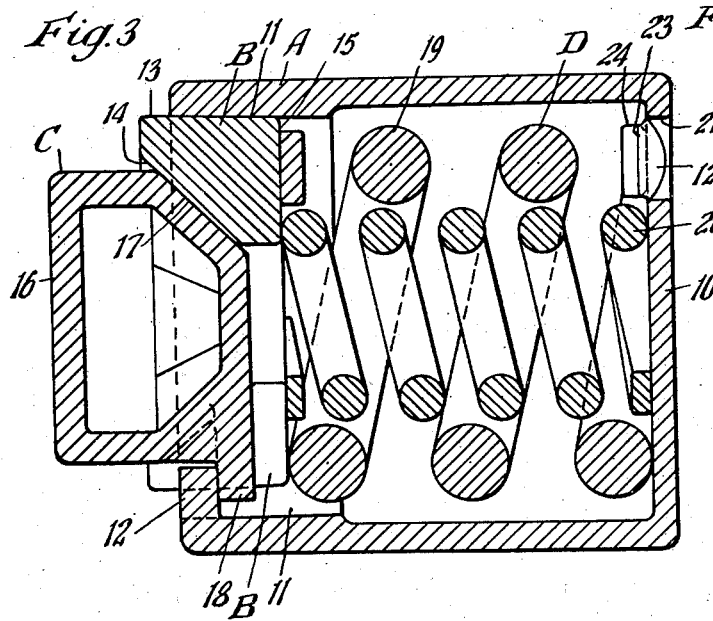
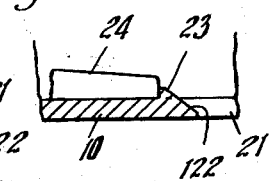
Inventor
Edward H. Lehman
By Henry Fuchs.
Atty.

Patented Jan. 2, 1945

2,366,201

UNITED STATES PATENT OFFICE 2,366,201

FRICTION SHOCK ABSORBING MECHANISM

Edward H. Lehman, Chicago, Ill., assignor to W. H. Miner, Inc., Chicago, Ill., a corporation of Delaware Application November 8, 1943, Serial No. 509,453

6 Claims. (Cl. 213—34)

This invention relates to improvements in friction shock absorbing mechanisms, especially adapted for draft riggings of railway cars.

The main object of the invention is to provide a friction shock absorbing mechanism comprising the following parts: a friction casing; friction clutch having frictional sliding engagement within the casing; and spring resistance means within the casing opposing inward movement of the clutch, wherein the parts are so proportioned and designed that the maximum diameter of spring may be employed, thereby materially increasing the spring resistance capacity of the device.

A more specific object of the invention is to provide a friction shock absorbing mechanism including a friction casing closed at one end by a permanent wall and open at the other end, the opening of said last named end being provided with inturned stop shoulders; a friction clutch telescoped within the open end of the casing and having its outward movement limited by engagement with the shoulders of the casing; and a coil spring within the casing yieldingly opposing inward movement of the clutch, wherein the coil spring is insertable within the casing by threading the same through an opening provided in said rear wall, thereby making possible the use of a spring of increased diameter and capacity over springs, generally employed, designed to be assembled with the casing by being entered through the open end, the size of the opening of which is restricted due to the inturned stop lugs.

Other objects of the invention will more clearly appear from the description and claims hereinafter following.

In said drawing, Figure 1 is a top plan view of my improved shock absorbing mechanism. Figure 2 is a bottom plan view. Figure 3 is a horizontal, longitudinal, sectional view, corresponding substantially to the line 3—3 of Figure 1. Figure 4 is a sectional view of a portion of the rear end of the mechanism, corresponding substantially to the curved line 4—4 of Figure 2.

As shown in the drawing, my improved shock absorbing mechanism comprises broadly a friction casing A; three friction shoes B—B—B; a wedge block C; and a spring resistance D.

The casing A is in the form of a casting of hexagonal, interior and exterior, transverse section, closed at the rear end by a transverse wall 10, and open at the front end. At the open end, the casing is provided with three interior, inwardly converging, friction surfaces 11 of V-shaped, transverse section, each V-shaped surface being formed by the outer end portions of two adjacent side walls of the hexagonal casing. The open end of the casing is provided with inturned stop lugs 12 at alternate corners thereof, that is, at the corners between the V-shaped friction surfaces 11.

The friction shoes B, which are three in number, are disposed symmetrically about the central longitudinal axis of the mechanism, each shoe having a friction surface 13 of V-shaped, transverse section on the outer side thereof engaged with one of the V-shaped friction surfaces 11 of the casing. On the inner side, that is, the side nearest the center of the mechanism, each shoe has a wedge face 14 of V-shaped, transverse section. The wedge faces 14—14—14 of the three shoes converge inwardly of the mechanism. At the rear end, each shoe has a transverse abutment face 15 cooperating with the front end of the spring resistance D. As shown in Figure 1, the three shoes B—B—B are spaced apart circumferentially of the casing A, thus providing predetermined clearance between adjacent shoes. This clearance is sufficient to permit the shoes to pass between the lugs 12—12—12 in entering the shoes through the open front end of the casing in assembling the mechanism.

The wedge C is in the form of a hollow block having a flat front end face 16 adapted to receive the actuating force and three, inwardly converging, wedge faces 17 of V-shaped, transverse, cross section at the inner end thereof engaged with and correspondingly inclined to the V-shaped wedge faces 14—14—14 of the shoes B—B—B. At the inner end, the wedge C is provided with three radially projecting lugs or arms 18—18—18. The lugs 18 are alternated with the wedge faces 17 of the wedge block, being located at the corners of the wedge between adjacent wedge faces. The lugs 18 are thus aligned with the lugs 12 of the casing and engage in back of the latter to limit outward movement of the wedge.

The spring resistance D comprises a heavy outer coil 19 and a lighter inner coil 20 bearing at their opposite ends respectively on the end wall 10 of the casing A and the abutment faces 15 at the inner ends of the shoes B. The springs 19 and 20 are preferably under initial compression in the assembled full release position of the parts of the mechanism. The heavy outer coil spring 19 is of an outside diameter which precludes insertion through the opening at the front end of the casing which is partly obstructed by the inwardly projecting stop lugs 12. To provide for insertion of this large diameter spring 19 within the casing A, the rear wall 10 is provided with an arc-shaped opening or slot 21, to one side of the center of the casing, through which the coil spring is threaded in assembling the same with the casing. The opening 21 is in longitudinal alignment with the corresponding side of the coil spring 19 and is of slightly greater width than the diameter of the bar forming the coils of the spring 19 and of sufficient length to permit the coils of the spring to be threaded therethrough. The opposite end walls of the opening 21 are preferably rounded, as indicated at 22, said rounded end walls being beveled, as indicated at 122—122, to correspond to the pitch of the coil of the spring. An internal abutment lug 23 for the tang 24 of the spring is provided on the wall 10 at one end of the opening, as clearly shown in Figures 3 and 4, to hold the spring 19 against rotation, in the assembled condition of the parts, and prevent the tang 24 thereof from passing into the opening or slot 21.

In assembling my improved shock absorbing mechanism, the spring 19 is first placed within the casing by threading the coils of the same through the opening 21 of the rear wall 10 of the casing, the spring being rotated in the proper direction to perform the threading operation. After the spring 19 is disposed within the casing, the same is adjusted by rotation thereof, so that the tang 24 abuts the abutment lug 23, as clearly shown in Figure 4. The spring 20 is then placed within the coil 19, being entered through the open front end of the casing. Next, the shoes B—B—B are placed within the casing, on top of the springs 19 and 20, and forced inwardly of the casing to a predetermined extent, against the resistance of the springs, and held in that position by a suitable tool. The extent to which the shoes are forced into the casing is such that the front ends of the shoes are clear of the inner end of the wedge block C when the latter is positioned within the casing with the lugs 18 thereof disposed rearwardly of the lugs 12 of said casing. With the shoes held in this position, the wedge C is inserted into the open end of the casing, rotated to such a position that the lugs 18 will clear the lugs 12 of the casing. After the wedge has been pushed inwardly to a sufficient extent to dispose the lugs thereof rearwardly of the lugs 12, the wedge is turned to bring the lugs 18 in alignment with the lugs 12 in back of the same. The holding tool is then withdrawn from the shoes B—B—B, permitting the springs 19 and 20 to force the shoes outwardly against the wedge faces of the wedge, thereby forcing the lugs of the wedge into engagement with the lugs 12 of the casing. As will be evident, outward movement of the wedge is limited by the lugs 12, thereby maintaining the parts of the mechanism assembled.

The operation of my improved shock absorbing mechanism is as follows: Upon compression of the mechanism, the wedge C is forced inwardly of the casing, spreading the shoes B—B—B apart and carrying the same inwardly against the resistance of the springs. High shock absorbing capacity is thus provided due to the friction between the sliding shoes and the casing friction surfaces. During release, the expansive action of the springs restores all of the parts to the normal full release position shown in Figure 3, outward movement of the wedge being arrested by engagement of the lugs 18 thereof with the stop lugs of the casing.

I have herein shown and described what I now consider the preferred manner of carrying out my invention, but the same is merely illustrative and I contemplate all changes and modifications that come within the scope of the claims appended hereto.

I claim:

1. In a friction shock absorbing mechanism, the combination with a friction casing closed at the rear end by a wall and open at the front end; of a friction clutch telescoped within the open end of the casing; and a coil spring within the casing opposing inward movement of the clutch, said rear wall being provided with an opening therethrough at one side of the center of the casing through which the coils of the spring are threaded in assembling the mechanism.

2. In a friction shock absorbing mechanism, the combination with a friction casing closed at the rear end by a wall and open at the front end; of a friction clutch telescoped within the open end of the casing; and a coil spring within the casing opposing inward movement of the clutch, said rear wall being provided with an elongated opening therethrough, at one side of the center of the casing, through which the spring is threaded in inserting the same within the casing in assembling the mechanism.

3. In a friction shock absorbing mechanism, the combination with a friction casing closed at the rear end by a wall and open at the front end; of a friction clutch telescoped within the open end of the casing; and a coil spring within the casing opposing inward movement of the clutch, said rear wall being provided with an elongated arc-shaped slot extending therethrough, at one side of the center of the casing through which the coils of the spring are threaded in inserting the spring within the casing in assembling the mechanism.

4. In a friction shock absorbing mechanism, the combination with a friction casing open at one end and closed at the other end by a transverse wall, said wall having an opening therethrough at one side of the center of the casing; of a friction clutch telescoped within the open end of the casing, said clutch including a central wedge block and shoes surrounding said block; and spring resistance means within the casing, said spring resistance means including an inner coil spring and an outer heavier coil spring, said outer coil spring being insertable within the casing through said opening in said wall by threading the coils thereof through said opening, and said inner coil spring being insertable within the casing through the open front end thereof.

5. In a friction shock absorbing mechanism, the combination with a friction casing open at one end and closed at the other end by a transverse wall, said wall having an elongated arc-shaped slotlike opening therethrough at one side of the center of the casing; of a friction clutch telescoped within the open end of the casing, said clutch including a central wedge block and shoes surrounding said block; and spring resistance means within the casing, said spring resistance means including an inner coil spring and an outer heavier coil spring, said outer coil spring being insertable within the casing through said opening in said wall by threading the coils thereof through said opening, and said inner coil spring being insertable within the casing through the open front end thereof.

6. In a friction shock absorbing mechanism, the combination with a friction casing of hexagonal, interior, cross section open at one end and closed at the other end by a transverse wall, said casing presenting three interior friction surfaces of V-shaped, transverse section at said open end, said wall having an arc-shaped, elongated slot opening therethrough; of inturned stop lugs at the open end of the casing, said stop lugs being arranged at alternate corners of the casing between said V-shaped friction surfaces; a central wedge block having inwardly converging wedge faces at the inner end thereof of V-shaped, transverse section; radially, outwardly projecting lugs on said wedge engageable with said lugs of the casing to limit outward movement of the wedge; friction shoes interposed between the wedge and friction surfaces of the casing, said shoes having V-shaped wedge and friction surfaces on opposite sides thereof interengaged with the V-shaped faces and surfaces of the wedge and casing; and spring resistance means within the casing including an inner coil spring and a heavier outer coil spring, said outer coil spring being insertable within the casing through said arc-shaped slot by threading the coils thereof through said slot.

EDWARD H. LEHMAN.